Dec. 31, 1940.                L. G. EHMANN                2,226,755
                              CONNECTING LINK
                            Filed Sept. 6, 1939
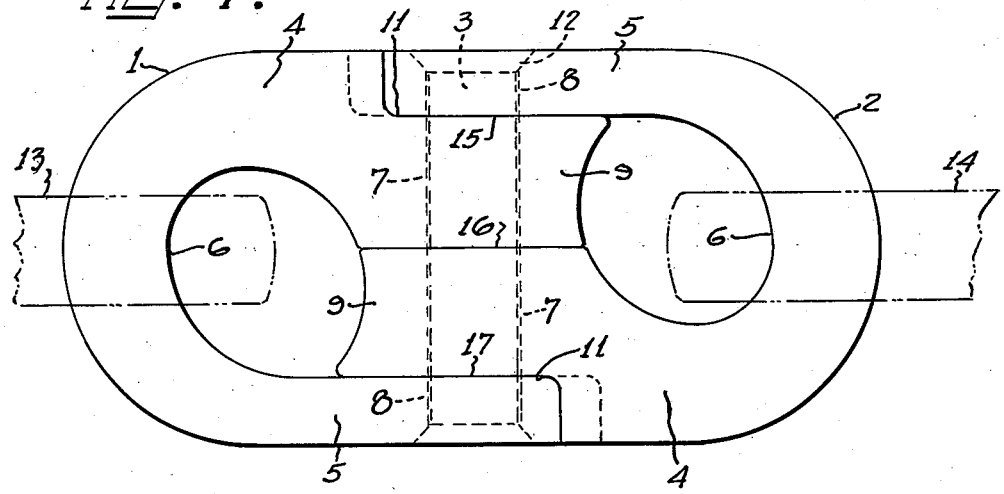
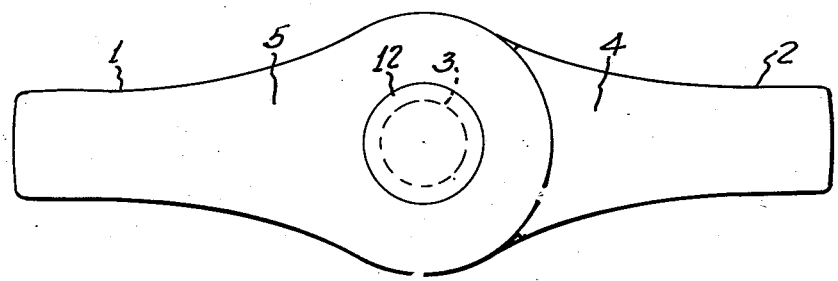
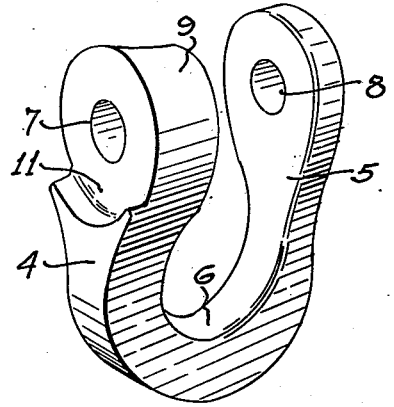

Patented Dec. 31, 1940

2,226,755

UNITED STATES PATENT OFFICE 2,226,755

CONNECTING LINK

Leslie G. Ehmann, Portland, Oreg., assignor to Electric Steel Foundry Company, Portland, Oreg., a corporation of Oregon Application September 6, 1939, Serial No. 293,611

12 Claims. (Cl. 59—86)

This invention relates to a connecting link and has special reference to a chain repair link.

Heretofore, difficulty has been experienced in the use of repair links in heavy duty chains as used, for instance, in the logging industry and the like, because of the weakening effects of the extreme abrasion encountered in such industries. Repair links made according to the design of conventional chain links have their structural parts exposed to all the wear to which the chain as a whole is subjected, and in the case where the repair link is larger than the chain links, or has projecting parts, the wear on the repair link is even greater than the wear on the original links.

Applicant has overcome this difficulty by providing a repair link which may be made to conform in size and pitch to the chain links with which it is to be associated, so that the wear on the repair link is no greater than the wear on any other part of the chain. In addition, applicant has designed his repair link so that the principal structural elements are near the central portion of the link, approximately in the line of tension, and protected by parts which may suffer considerable abrasive wear without weakening the link.

It is, therefore, an object of the invention to provide an improved connecting link for use wherever such links are required.

A prime object of the invention is to provide a chain repair link so designed that it may be subjected to extreme abrasive wear without materially weakening the link.

Another object of the invention is to provide a chain repair link of two identical U-shaped parts, or companion members, each member being designed as a hook, with one arm thicker than the other and constituting a shank portion which is protected from abrasive wear to a considerable extent by the overlapping relation of the small arm of the companion member.

A further object is to provide a chain repair link which may be made to a pitch corresponding to chain links with which it is to be associated and which is of pivoted construction making it somewhat flexible in use.

With these and other objects and advantages in mind, the invention resides in the novel construction and combination of parts hereinafter described, illustrated in the accompanying drawing, and set forth in the appended claims; it being understood that various changes within the scope of the claims may be resorted to without departing from the spirit or sacrificing any of the advantages of the invention.

In the drawing:

Figure 1 is a plan view of a connecting link embodying the principles of applicant's invention.

Figure 2 is a side elevation of the link illustrated in Figure 1.

Figure 3 is a perspective view of one of the two identical U-shaped members comprising the link.

Applicant's connecting link is composed of two identical members 1 and 2 pivotally connected together by means of a pin 3. Each of these U-shaped members 1 and 2 is structurally designed as a hook having a shank 4 and an end portion 5 defining a load supporting eye 6. The shank 4 is provided with an opening 7 to receive the pin 3. The end portion 5 is provided with an opening 8 for the same purpose. The shank 4 and the end portion 5 constitute arms of a U whereby the members 1 and 2 may be termed U-shaped members.

It will be noted that the shank 4, constituting one of the arms of said U, is larger than the other arm or end portion 5. It is also noted that the large end portion 9 on the end of the shank 4 is deformed or offset towards the other arm 5. This provides a typical hook structure wherein the opening in the shank is approximately in the line of tension when a load is applied to the bight of the hook. The offset end portion 9 provides a recess 11 of a size which will accommodate the end portion 5 of the companion member. Thus, the two members fit together in smooth, symmetrical relationship, with the large arms or shank portions 4 approximately in the line of tension when the link is loaded, and with the small arms 5 in overlapping relation to the large end portions 9. The pin 3 may be held in place by riveting the ends thereof as shown at 12.

In the preferred embodiment of applicant's invention as herein illustrated, the large arm or shank 4 has approximately twice the cross-sectional area of the small arm or end portion 5, as in a typical hook design. By reason of this design excessive wear on the outer surface of the link will not materially detract from its strength because, even if the end portion 5 is worn through sufficiently so that it contributes little in tensile strength, the members 1 and 2 will still function as hooks and maintain a substantial part of their original strength. This construction also makes it possible to make repair links conforming to the standard pitches of chain links with which they would be used. This fact, and the fact that applicant's repair link has no parts protruding abruptly beyond the limits of the original chain links, insures that the repair link will not be subjected to excessive wear beyond the wear of the chain in general.

The solid chain links 13 and 14, indicated by dotted lines in Figure 1, illustrate how the large end portions 9 lie approximately in the line of tension. It will be seen also from Figure 1 that the two large end portions 9 bear upon the central portion of the pin 3, and that the end portions 5 bear upon the end portions of the pin 3, and, further, that these four arms collectively have bearing upon substantially the full length of the pin 3. This arrangement of the arms of the two U-shaped members in closely fitting relationship insures that the pin 3 will be loaded in triple shear. In other words, for the link to fail by reason of failure of the pin, there must be failure in the three lines of shear 15, 16 and 17.

In assembled relation, the U-shaped members 1 and 2 overlap on the pin 3 so that the large end portions 9 form a continuous bridge between the respective outer arms 5. This bridge effect strengthens the link in the same manner as the web commonly employed on large solid links, as for instance in anchor chains, by preventing deforming of the link when subjected to extreme tension. Under such tension there is a tendency for the parallel side portions of an unbridged chain link to close in toward each other, causing failure in the metal at the point of tangency with the curved end portions.

By the construction herein described there is provided a connecting link, or repair link, having a tensile strength equal to the original solid link. This type of repair link may be made equal to the original link in substantially all other functional respects also, such as pitch and size, so that it will give satisfactory service in any capacity in which the original link was employed. Applicant's repair link embodies no fragile parts or projecting elements to render it inoperative as a result of wear, and involves the casting or forging of only one piece, in addition to the connecting pin. This degree of simplicity is of considerable importance in industry where repair links are to be manufactured and stocked for many different sizes of chains.

Although described in connection with the illustrated embodiment as a chain repair link, applicant's invention is not limited to use in chain repairs, as it has utility in general wherever a connecting link may be employed. In addition, its flexibility, due to its pivoted construction, gives it an added advantage over solid links in passing around sheaves, hoisting drums and the like.

Having now described my invention and in what manner the same may be used, what I claim as new and desire to protect by Letters Patent is:

1. A connecting link comprising a pair of identical, opposed, U-shaped members, each of said members having two arms and aligned openings in the ends of said arms, one arm on each member being larger in cross section than the remaining arm, and being deflected inwardly of said U, and a pin through said openings to connect said pair of members together, said members being arranged on said pin so that each inwardly deflected arm lies between the arms of the opposite member, and each remaining arm lies outside of the arms of the opposite member.

2. A connecting link comprising a pair of identical, U-shaped members, each member having a large arm and a small arm, aligned openings in the ends of said arms, a pin through said openings, said members being arranged on said pin with the arms of the two members in alternate relationship, the small arms being outside of the large arms, and the large arms being deflected inwardly to bring their openings into substantial alignment with the line of tension in said link when loaded.

3. A connecting link comprising a pair of identical, U-shaped members, each member having a large arm and a small arm, aligned openings in the ends of said arms, and a pin through said openings, said large arms carrying the mid-portion of said pin and said small arms carrying the end portions of said pin, the large arms being deflected inwardly to bring their openings into substantial alignment with the line of tension through said link when loaded.

4. A flexible connecting link comprising a pair of U-shaped members, each of said members having two arms and aligned openings in the ends of said arms, and a pin through said openings, said members being disposed on said pin so that one arm of each member is included between the two arms of the other member, said included arms being deflected inwardly to bring their openings substantially into the line of tension through said link.

5. A flexible connecting link comprising a pair of U-shaped members having aligned openings, and a pin through said openings to pivotally connect said members, one arm of each said U-shaped member bearing on the central portion of said pin in substantial alignment with the line of tension through said link.

6. A flexible connecting link comprising a pair of U-shaped members having arms, a pin passing through the respective arms of said members alternately so as to load said pin in triple shear, the space between the arms of each member being approximately equal to the thickness of the arm of the other member received therebetween, said arms collectively bearing on substantially the entire length of said pin.

7. A flexible connecting link comprising two opposed U-shaped members, each of said members having two arms and aligned openings in the ends of said arms, a pin through said openings, said arms of said two members being arranged in alternate relation on said pin, and collectively bearing on substantially the full length of said pin, the line of tension through said link passing substantially through one of the arms of each member.

8. A load-supporting element comprising a substantially U-shaped member having two arms and aligned openings in the ends of said arms for receiving a load-supporting means, one of said arms having its end potion deflected toward the other arm, said one arm having a substantially greater cross section than said other arm, whereby a load on said element will exert a tension substantially on a line through said deflected portion.

9. A connecting link comprising two identical companion members connected together by a common pin, each of said companion members having a large arm shaped to bear on the central portion of said pin substantially in the line of tension when said link is loaded, and a smaller arm bearing on an end portion of said pin, and space between the arms of each member being approximately equal to the thickness of the large arm of the companion member, each of said large arms being received in said space in a companion member.

10. A connecting link comprising a pair of companion members connected together by a common pin, each of said members having a load-supporting eye, a large arm and a small arm, the large arm of each member being deformed so as to bear upon the central portion of said pin substantially in the line of tension between said eyes, the small arm of each member being carried by an end portion of said pin.

11. A connecting link comprising a pair of load-supporting eyes, each eye having a main load-supporting arm located centrally of said link and bearing against an arm of the other eye and a secondary protecting arm overlapping one of said load-supporting arms.

12. A connecting link comprising a pair of opposed, U-shaped members having arms, a pin passing through the respective arms of said members, the innermost arms on said pin being inwardly deflected so as to contact each other centrally of the pin, said arms fitting together on said pin in compact, side-by-side relation so that the innermost arms form a bridge between the outer arms of the assembled link.

LESLIE G. EHMANN.